US009068670B2

(12) United States Patent
Dickins et al.

(10) Patent No.: US 9,068,670 B2
(45) Date of Patent: Jun. 30, 2015

(54) VALVE FOR AN INFLATABLE STRUCTURE

(71) Applicant: LEAFIELD MARINE LIMITED, Wiltshire (GB)

(72) Inventors: David Louis Dickins, Wiltshire (GB); Stephen David Horn, Trowbridge (GB)

(73) Assignee: LEAFIELD MARINE LIMITED (GB)

( * ) Notice: Subject to any disclaimer, the term of this patent is extended or adjusted under 35 U.S.C. 154(b) by 141 days.

(21) Appl. No.: 13/626,373

(22) Filed: Sep. 25, 2012

(65) Prior Publication Data
US 2013/0134344 A1   May 30, 2013

(30) Foreign Application Priority Data

Nov. 25, 2011   (GB) .................................. 1120400.5
Dec. 5, 2011    (GB) .................................. 1120872.5

(51) Int. Cl.
*F16K 15/20*   (2006.01)
*F16K 31/528*  (2006.01)

(52) U.S. Cl.
CPC ....... *F16K 31/5286* (2013.01); *Y10T 29/49412* (2015.01)

(58) Field of Classification Search
CPC ....................................................... F16K 31/44
USPC ...................... 251/251, 252, 253; 137/625.3
See application file for complete search history.

(56) References Cited

U.S. PATENT DOCUMENTS

| 2,077,997 | A | * | 4/1937 | Hedene | 137/384 |
| 2,477,127 | A | * | 7/1949 | Holtz | 251/223 |
| 3,370,827 | A |   | 2/1968 | Stehlin | |
| 3,705,429 | A | * | 12/1972 | Nail | 5/710 |
| 3,893,478 | A |   | 7/1975 | Peters | |
| 4,723,929 | A | * | 2/1988 | Parish | 441/39 |
| 4,766,628 | A | * | 8/1988 | Walker | 5/706 |
| 4,807,658 | A | * | 2/1989 | Patti | 137/223 |
| 5,215,522 | A | * | 6/1993 | Page et al. | 604/33 |
| 5,334,064 | A | * | 8/1994 | Ketterman et al. | 441/42 |

(Continued)

FOREIGN PATENT DOCUMENTS

| CH | 607786 A | 10/1978 |
| EP | 2060835 A2 | 5/2009 |

(Continued)

OTHER PUBLICATIONS

International Search Report of GB 1120400.5; Feb. 22, 2012; 3 pgs.
Search Report for FR1260449; Jul. 14, 2014; 6 pgs.

*Primary Examiner* — John K Fristoe, Jr.
*Assistant Examiner* — Christopher Ballman
(74) *Attorney, Agent, or Firm* — Gardner Groff Greenwald & Villanueva, PC

(57) ABSTRACT

A valve comprising a valve body having an inlet and an outlet; a valve member moveable in a linear direction with respect to the valve body between a closed condition in which flow between the inlet and the outlet is restricted and an open condition; and an actuator coupled to the valve member such that the valve member is constrained to rotate with the actuator and is movable in the linear direction with respect to the actuator, wherein the valve is configured such that rotation of the actuator causes the valve member to move in the linear direction with respect to both the actuator and the valve body between the closed condition and the open condition.

18 Claims, 9 Drawing Sheets

(56) References Cited

U.S. PATENT DOCUMENTS

| | | |
|---|---|---|
| 7,231,739 B2 * | 6/2007 | Scherba .................. 52/2.18 |
| 7,410,146 B2 | 8/2008 | Huang |
| 8,216,165 B2 * | 7/2012 | Ravikumar et al. ............. 602/13 |
| 2010/0132121 A1 | 6/2010 | Chao |

FOREIGN PATENT DOCUMENTS

| | | |
|---|---|---|
| GB | 2131124 A | 6/1984 |
| GB | 2147974 A | 5/1985 |

* cited by examiner

A-A

DETAIL B

VALVE FOR AN INFLATABLE STRUCTURE

CROSS-REFERENCE TO RELATED APPLICATIONS

This application claims priority under 35 U.S.C. §119 to British (GB) Patent Application No. 1120400.5 filed on 25 Nov. 2011, and to British (GB) Patent Application No. 1120872.5 filed on 5 Dec. 2011. British (GB) Patent Application No. 1120400.5 and British (GB) Patent Application No. 1120872.5 are hereby incorporated by reference in their entireties for any and all purposes.

BACKGROUND

This invention relates to a valve for an inflatable structure, and particularly, although not exclusively, relates to a transfer valve for an inflatable craft.

Inflatable craft, such as boats, often comprise multiple chambers. The chambers are isolated from each other such that deflation of one chamber, for example as a consequence of a leak, does not result in deflation of the other chambers.

A problem associated with such craft is that prior to and after use of the craft, each chamber must be inflated/deflated independently of the others.

It is known to use valves, such as those disclosed in U.S. Pat. No. 6,178,911 to connect the chambers. The valves are opened during controlled inflation or deflation of the vessel, but are closed during use of the craft so that the chambers are isolated from each other. Consequently, a leak in one chamber does not cause deflation of the other chambers.

Known valves are difficult to operate, install and maintain.

SUMMARY

According to a first aspect of the present invention there is provided a valve comprising: a valve body having an inlet and an outlet; a valve member moveable in a linear direction with respect to the valve body between a closed condition in which flow between the inlet and the outlet is restricted and an open condition; and an actuator coupled to the valve member such that the valve member is constrained to rotate with the actuator and is movable in the linear direction with respect to the actuator, wherein the valve is configured such that rotation of the actuator causes the valve member to move in the linear direction with respect to both the actuator and the valve body between the closed condition and the open condition. The closed condition may be a condition in which flow between the inlet and the outlet is prevented.

The valve may comprise a first stop which prevents continued rotation of the actuator with respect to the valve body when the valve member is moved into the open condition, and a second stop which prevents continued rotation of actuator with respect to the valve body when the valve member is moved into the closed condition.

The first and second stops may be arranged such that the valve member is displaced between the open condition and the closed condition by rotating the actuator through less than one revolution with respect to the valve body, for example through not more than half a revolution or through not more than a quarter of a revolution.

The valve member may be arranged with respect to the housing such that rotation of the valve member with respect to the housing causes the valve member to move in the linear direction. The actuator may be arranged with respect to the valve body such that the actuator is constrained with respect to the valve body in the linear direction.

The valve may comprise a bias which is arranged to bias the valve member into the closed condition. The bias may comprise a resilient member disposed between the valve member and the actuator.

A passage may be provided through the valve member, the passage being arranged such that when the valve member is in the open condition, the inlet and the outlet are in fluid communication with each other through the passage. The passage may have an inlet port which is aligned with the inlet when the valve member is in the open condition and is obstructed by the valve body when the valve member is in the closed condition.

The actuator may comprise a cap which is manually rotatable.

The valve body may comprise a first part and a second part which are arranged to clamp a portion of a wall of an inflatable structure between the first part and the second part thereby securing the valve to the inflatable structure. The first part and second part may be configured to seal the valve to the inflatable structure.

The first part may comprise the inlet and the outlet and the second part may support the actuator for rotation with respect to the valve body, the valve member being arranged with respect to the actuator and the second part of the valve body such that the position of the valve member in the linear direction with respect to the first part of the valve body is maintained when different thicknesses of wall of an inflatable structure are clamped between the first part and the second part of the valve body.

The valve may further comprise a locking feature which is arranged to releasably lock the valve member in the open condition.

According to a second aspect of the present invention there is provided an inflatable structure comprising: first and second chambers, and a valve in accordance with the first aspect of the invention, the valve being arranged such that the inlet is disposed within the first chamber, wherein the first chamber and second chamber are in fluid communication with each other through the valve.

At least a portion of the valve may extend through a wall of the first chamber such that the actuator is actuable from outside of the inflatable structure.

The valve outlet may be connected to the second chamber by a collapsible tube, wherein a resilient spacer extends along at least part of the tube to resist collapsing of the tube. The resilient spacer may comprise a helical spring.

According to a third aspect of the present invention there is provided a connector comprising a valve in accordance with the first aspect of the invention, wherein the connector further comprises a fastener and a tube extending between the valve and the fastener.

The connector element may comprise a fastener body which is arranged to be fixed to a wall of an inflatable structure and a latching element which is connected to the tube, wherein the fastener body and the latching element comprise corresponding fastening features which are configured to provide a snap-fit connection between the fastener body and the latching element. The latching element may be configured such that it is rotatable with respect to the fastener body when the latching element is latched to the fastener body. The latching element may be resilient.

According to a fourth aspect of the invention there is provided a method of inflating an inflatable structure in accordance with the second aspect of the present invention, wherein the method comprises: opening the valve; supplying gas to the first chamber or second chamber to inflate both the first and second chambers; and closing the valve to isolate the first chamber from the second chamber.

According to a fifth aspect of the invention there is provided a method of deflating an inflatable structure in accordance with the second aspect of the present invention, wherein the method comprises: opening the valve; and expelling gas from the first chamber or second chamber into the other of the first and second chambers.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION OF EXAMPLE EMBODIMENTS

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
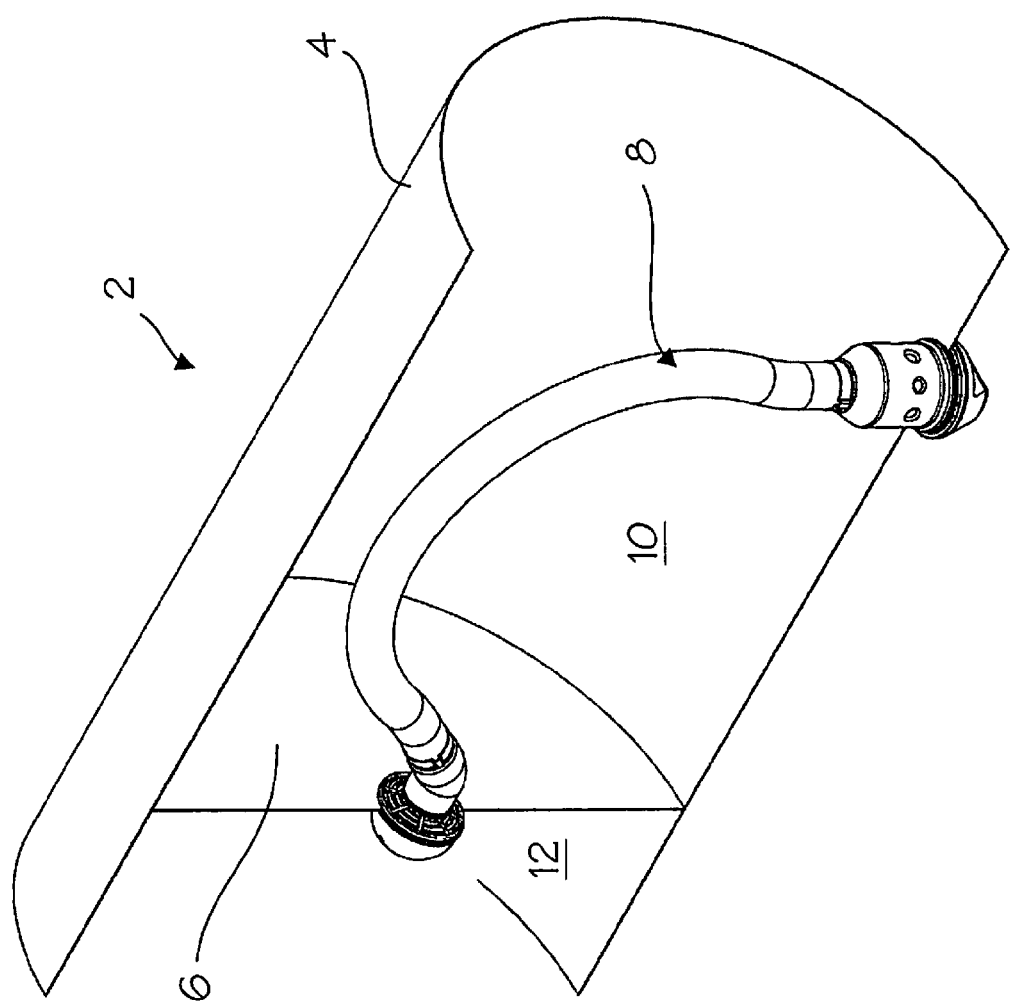
FIG. 1 shows part of an inflatable structure comprising first and second chambers and a connector.

FIG. 1 shows part of an inflatable structure 2, such as an inflatable craft, comprising an outer wall 4, a baffle 6 and a connector 8.

The baffle 6 is arranged with respect to the outer wall 4 such that the baffle 6 divides the inflatable structure 2 into a first chamber 10 and a second chamber 12. The chambers 10, 12 are hermetically sealed from each other by the baffle 6.

The connector 8 connects the first chamber 10 with the second chamber 12. The connector 8 provides fluid communication between the chambers 10, 12.

Figure 2:
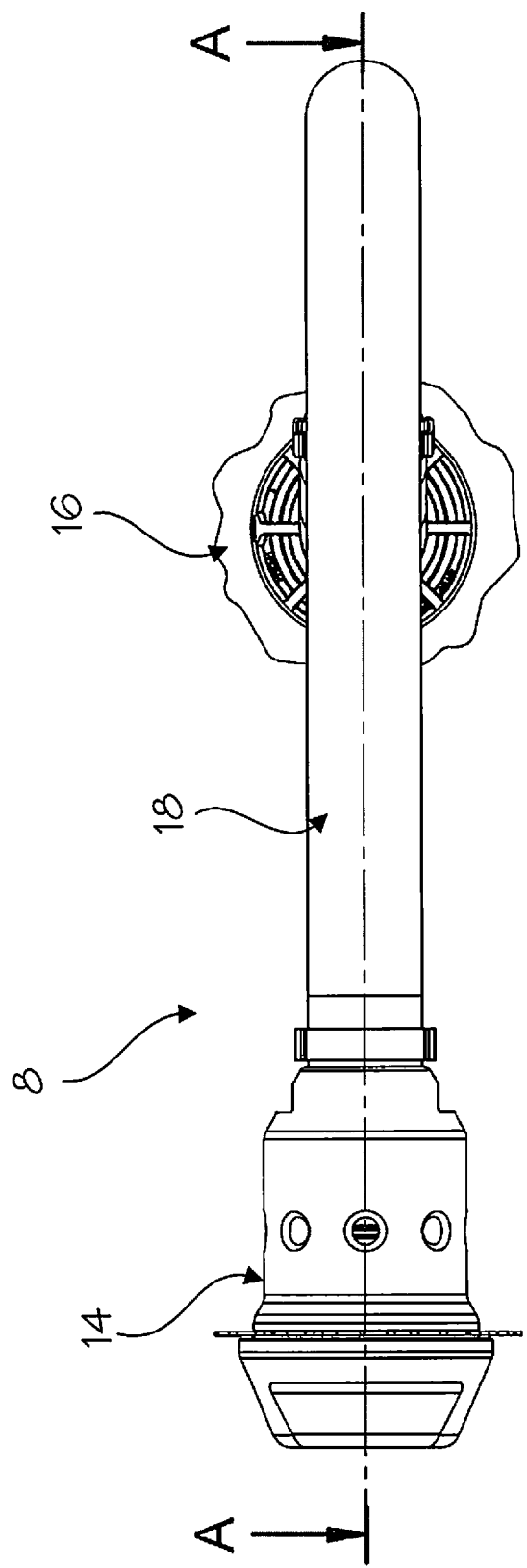
FIG. 2 is an elevation view of the connector shown in FIG. 1.
Figure 3:
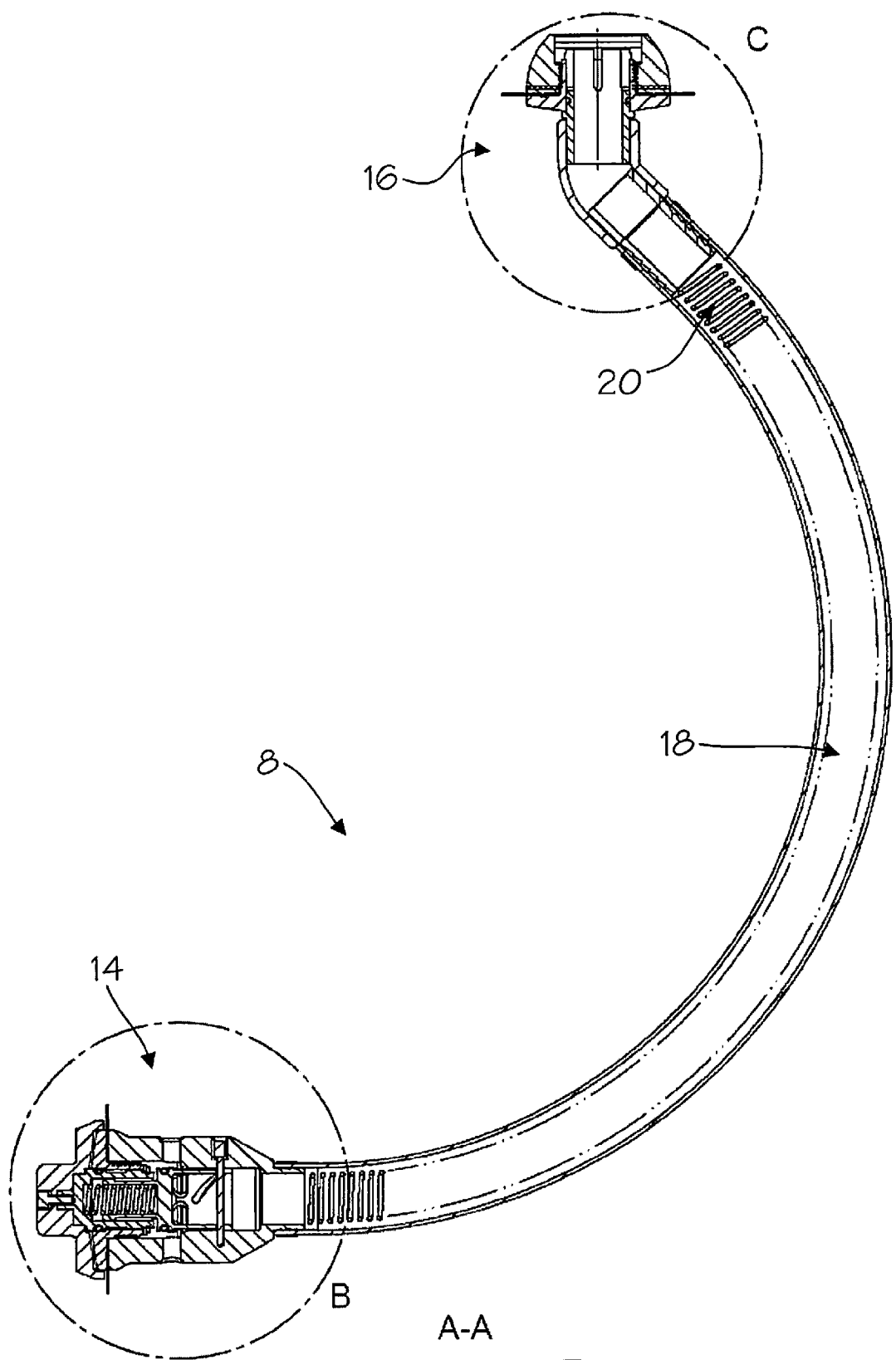
FIG. 3 is a sectional view of the connector shown in FIG. 2 along line A-A.

As shown in FIGS. 2 and 3, the connector 8 comprises a valve 14, which is a transfer valve, a fastener 16 and a collapsible tube 18 along which a resilient spacer 20 in the form of a helical spring extends. The collapsible tube 18 may be made of a suitable flexible material.

Figure 4:
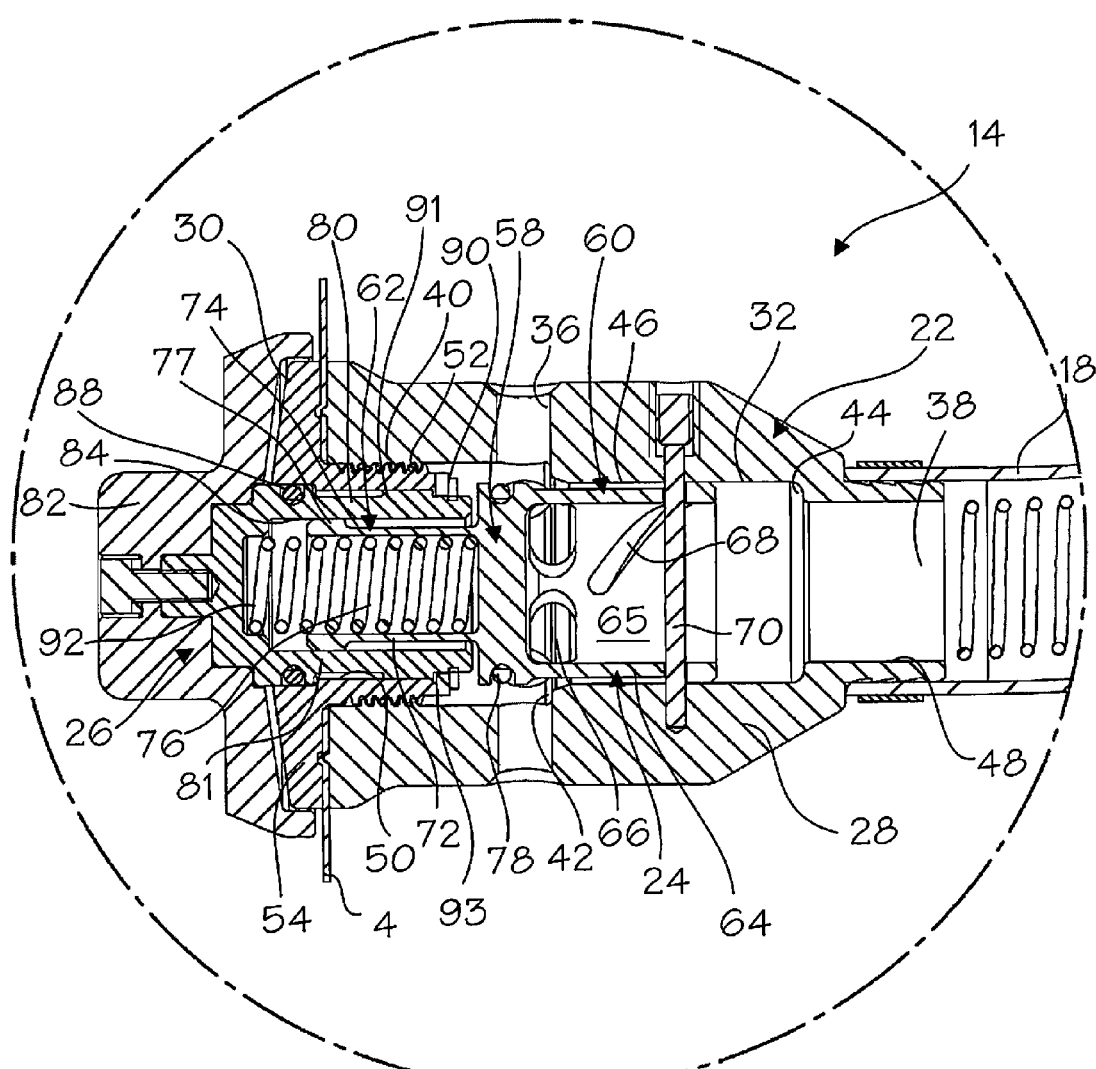
FIG. 4 is a sectional view of a valve shown as Detail B in FIG. 3.

FIG. 4 shows the valve 14. The valve 14 comprises a valve body 22, a valve member 24, in the form of a piston, and an actuator 26. The valve member 24 is arranged such that it is displaceable in a linear direction with respect to both the valve body 22 and the actuator 26.

The valve body 22 is substantially cylindrical. The valve body 22 comprises a first part 28 and a second part 30.

A bore 32 extends through the first part 28 in the longitudinal direction of the valve body 22. The first part 28 comprises a plurality of inlet passages 36 which extend radially from the bore 32. The passages 36 provide fluid communication between the first chamber 10 and the bore 32. The passages 36 are spaced circumferentially about the periphery of the first part 28.

One end of the bore 32 provides a valve outlet 38 which is in fluid communication with the inlet passages 36 via the bore 32. The other end of the bore 32 comprises a threaded portion 40 for receiving the second part 30 of the valve body.

The bore 32 comprises first and second shoulders 42, 44 which are disposed between the inlet passages 36 and the valve outlet 38. A first stepped section 46 of the bore 32 is defined between the shoulders 42, 44. A second stepped section 48 of the bore 32 is defined between second shoulder 44 and the outlet 38. The diameter of the first stepped section 46 is greater than the diameter of the second stepped section 48.

The second part 30 of the valve body 22 comprises a second longitudinally extending bore 50. The second part 30 comprises an externally threaded portion 52 at one end and a radially extending flange 54 at the other end.

The threaded portion 52 corresponds to the threaded portion 40 of the first part 28. The threaded portion 52 extends through an opening provided in the outer wall 4 of the inflatable structure 2 and engages with the threaded portion 40 of the first part 28.

The flange 54 extends radially outwardly such that it extends over the end of the first part 28. The flange 54 and the first part 28 are disposed on opposite sides of the outer wall 4 such that the outer wall 4 is sandwiched between the flange 54 and the first part 28. The flanged portion 54 is held by the threaded portions 40, 52 in pressing engagement with the first part 28 thereby clamping and sealing the valve 14 to the outer wall 4.

The valve member 24 comprises a disc-shaped middle portion 58, a restrictor portion 60 and a keyed portion 62. The restrictor portion 60 and the keyed portion 62 extend away from the middle portion 58 in opposite directions. The restrictor portion 60 extends into the first stepped section 46 of the bore 32.

The restrictor portion 60 comprises a cylindrical wall 64 which extends longitudinally from the periphery of the middle portion 58. The wall 64 defines a flow passage 65 through the restrictor portion 60. Ports 66 are provided through the wall 64. The ports 66 are spaced circumferentially about the wall 64. The ports 66 and flow passage 65 are arranged to provide fluid communication between the inlet passages 36 and the outlet 38 through the restrictor portion 60.

Two diametrically opposed slots 68 are also provided in the wall 64. The slots 68 extend circumferentially and longitudinally with respect to the wall 64. A pin 70 extends through the slots 68 and across the bore 32. The pin 70 is held captive at each end by the first part 28 of the valve body 22. The pin 70 and slots 68 are arranged such that when the valve member 24 is rotated within the bore 32 with respect to the valve body 22, the edges of the slots 68 slide over the pin 70 thereby driving the valve member 24 in the longitudinal direction of the bore 32. The valve member 24 is drivable between an open position in which the ports 66 are aligned with the passageways 36 and a closed position in which the ports 66 are obstructed by the surface of the first section 46 of the bore 32.

The middle portion 58 comprises a seal 78 which extends about the periphery of the middle portion 58. The seal 78 is arranged to seal against the surface of the first section 46 of the bore 32 when the valve member 24 is in the closed position.

In the open position the inlet passages 36 and the outlet 38 are in fluid communication with each other through the valve member 24. It will be appreciated that in the open position, the ports 66 may not be completely aligned with the passageways 36. The ports 66 may, for example, be offset from the passageways 36 as shown in FIG. 4. In the closed position the valve member 24 prevents fluid flow between the inlet passages 36 and the outlet 38.

Figure 8:
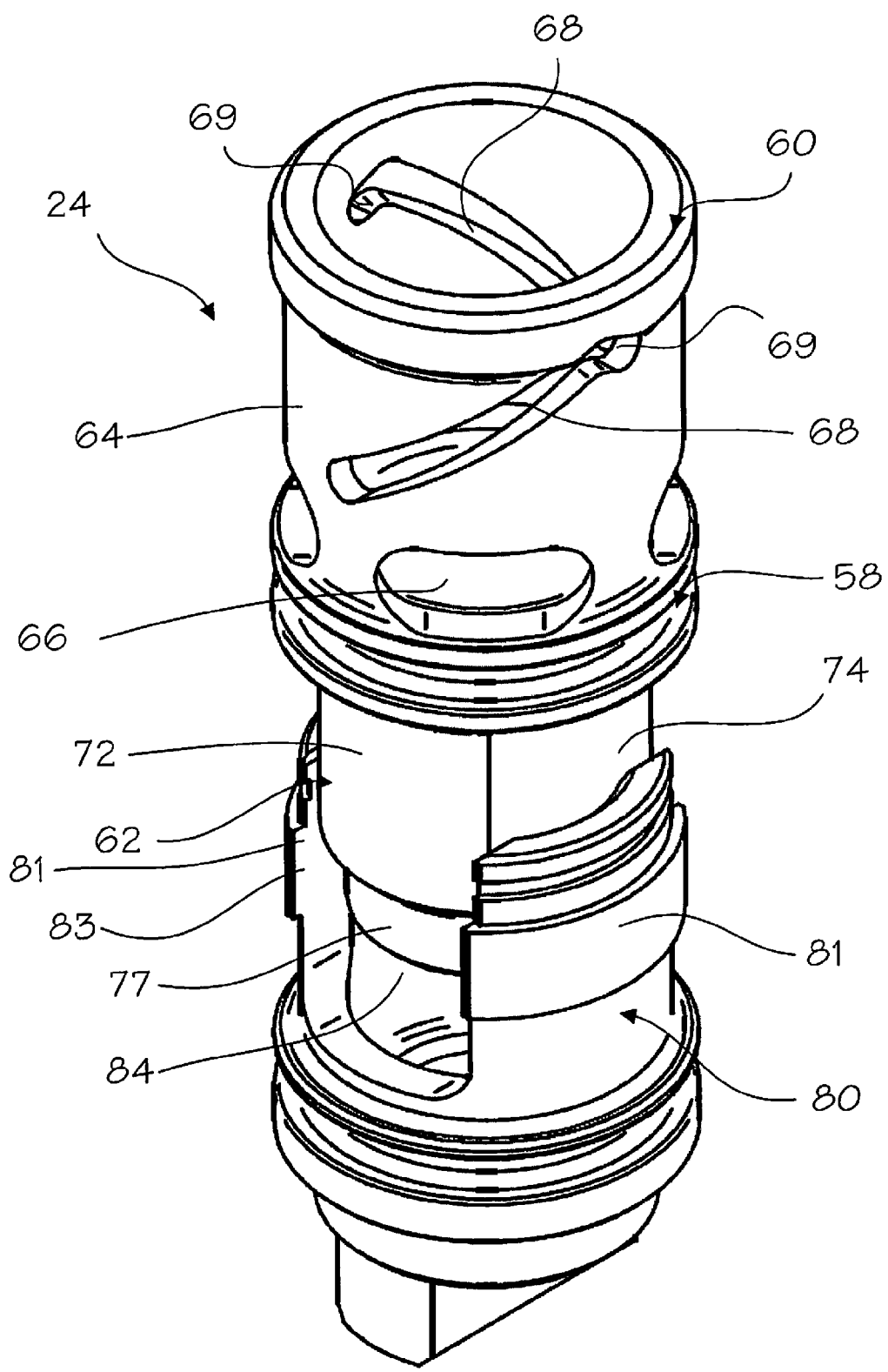
FIG. 8 is a perspective view of part of the valve shown in FIG. 4.
Figure 10:
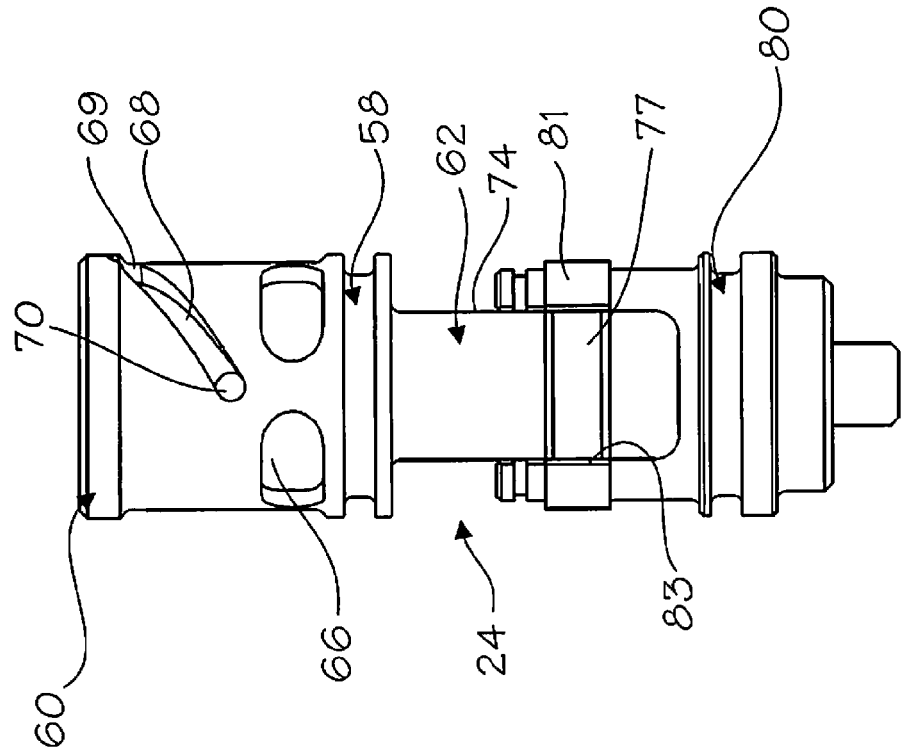
FIG. 10 is a further elevation view corresponding to the part of the valve shown in FIG. 8.
Figure 9:
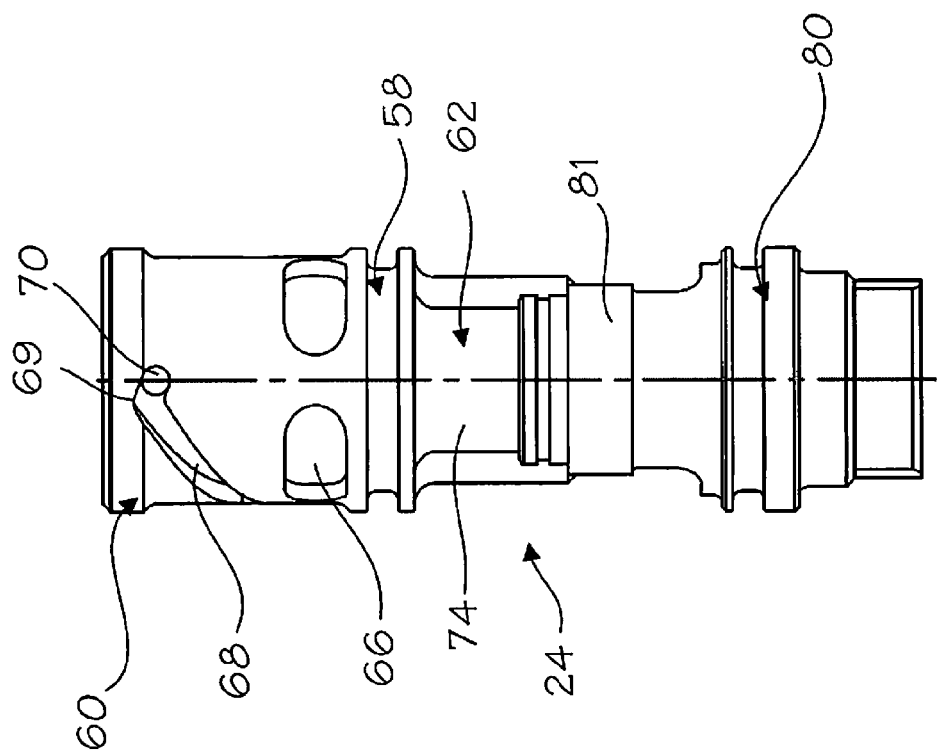
FIG. 9 is an elevation view corresponding to the part of the valve shown in FIG. 8.

The valve member 24 and part of the actuator 26 are shown in more detail in FIGS. 8 to 10.

The slots 68 are configured such that the valve member 24 is moved from the closed position to the open position by rotation of the actuator 26 through a quarter of a revolution. The respective ends of the slots 68 provide stops that provide positive indication that the valve member 24 is in the open or closed position.

The end of each slot 68 nearest the outlet 38 comprises a locking feature 69 for locking the valve member 24 in the open position. The locking feature 69 comprises a notched portion at the end of each slot 68, which receives the pin 70 such that the pin 70 inhibits movement of the valve member 24 from the open condition. Alternatively, the locking feature may be a portion of each slot 68 which extends perpendicularly to the direction of linear motion of the valve member 24, for example a portion of each slot 68 which extends only in the circumferential direction.

The keyed portion 62 comprises a wall 72 which extends from the middle portion 58. The wall 72 defines a cavity 76. The outer surface of the wall 72 comprises a keying feature 74, for example profiled surfaces of the wall 72. In the embodiment shown, the keying feature 74 comprises diametrically opposed flats forming the outer surface of the wall 72 for engagement with the actuator 26. Alternatively, the keying feature 74 may comprise a spline. The keyed portion 62 further comprises a cylindrical section 77 at the end of the keyed portion 62, which has a peripheral guide surface.

The actuator 26 comprises a drive part 80 and a cap 82. The drive part 80 comprises two arms 81 for receiving the keyed portion 62. The arms 81 define engagement surfaces 83 which slidably engage with the flats of the keying feature 74 so as to constrain the valve member 24 to rotate with the actuator 26. The arms 81 further define respective grooves 84 which extend along the length of each arm 81 to slidably receive the cylindrical section 77 of the keyed portion 62 of the valve member 24. The grooves 84 have respective curved surfaces which correspond to the curvature of the outer surface of the cylindrical section 77. The grooves 84 and the cylindrical section 77 axially align the valve member 24 with the actuator 26.

Alternatively, the drive part may comprise a bore which comprises a keying feature that corresponds to a keying feature of the keyed portion, wherein the keying feature and the bore interlock to constrain the valve member to rotate with the actuator and axially align the valve member and the drive part.

The sliding arrangement of the keyed portion 62 with respect to the arms 81 of the drive part 80 allows the valve member 24 to move linearly with respect to the actuator 26.

A seal 88 is provided about the periphery of the drive part 80 and seals against the second part 30 of the valve body 22.

The cap 82 is secured to the drive part 80 by a screw, or similar fastener, such that the cap 82 and the drive part 80 are constrained to rotate together. The cap 82 extends radially outwardly of the drive portion 80. A first retainer 90, such as a circlip, is provided on the drive part 80 to prevent the drive part 80 from being withdrawn from the second part 30 of the valve body 22. The drive part 80 further comprises a rib 91 and a second retainer 93, such as a washer, disposed between the rib 91 and the first retainer 90. The first retainer 90, rib 91 and second retainer 93 together prevent linear displacement of the actuator 26 with respect to the second part 30 of the valve body 22. The cap 82 may be shaped or marked so that the orientation of the cap 82 with respect to the valve body 22 or the outer wall 4 of the inflatable structure 2 can be readily determined.

A resilient bias in the form of a compression spring 92 is disposed between the actuator 26 and the valve member 24. The spring 92 is accommodated by the cavity 76 and a counter bore in the drive portion 80. The spring 92 acts on both the actuator 26 and the valve member 24 to urge the valve member 24 away from the actuator 26 into the closed position.

Figure 5:
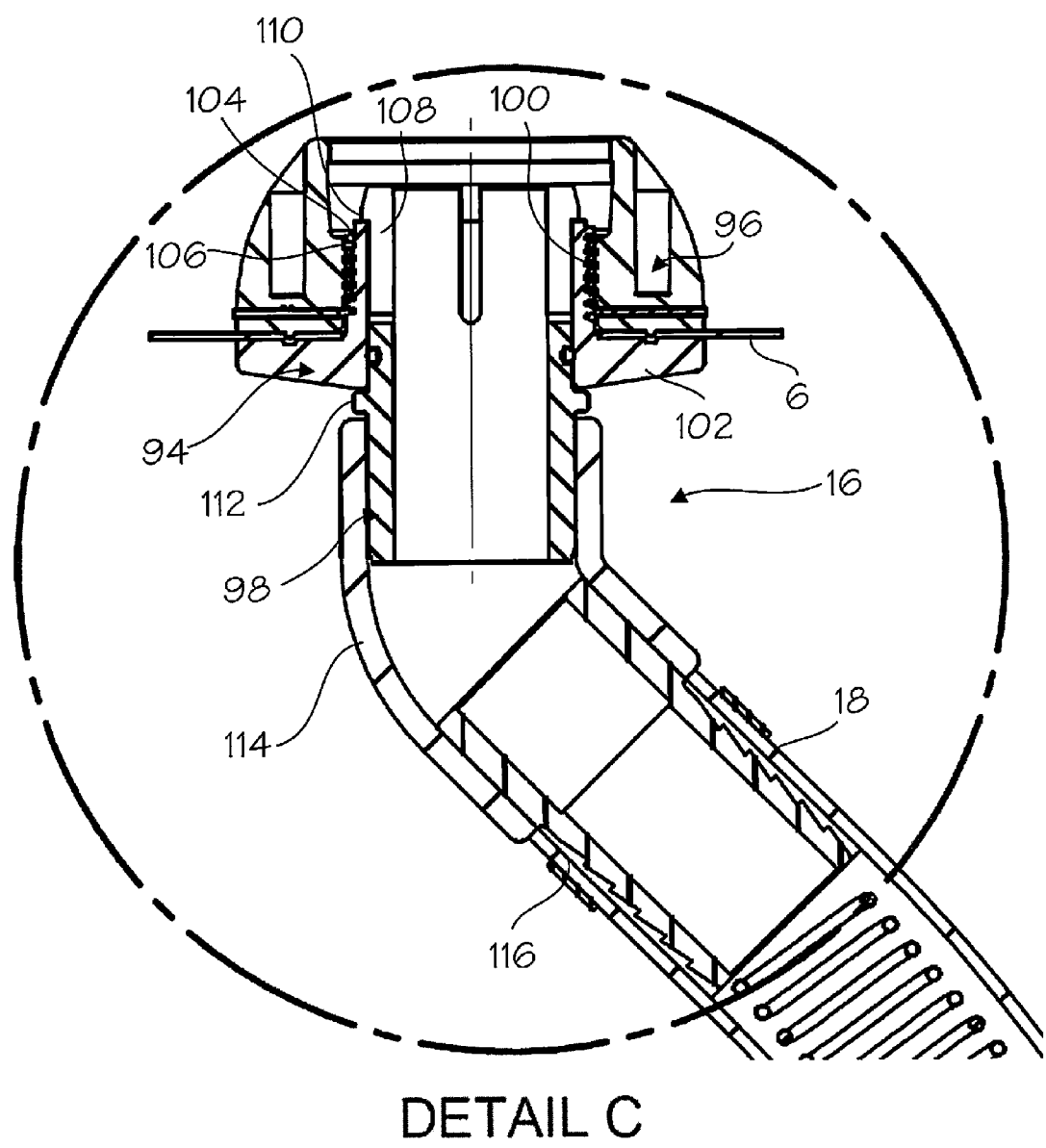
FIG. 5 is a sectional view of a fastener shown as Detail C in FIG. 3.
Figure 6:
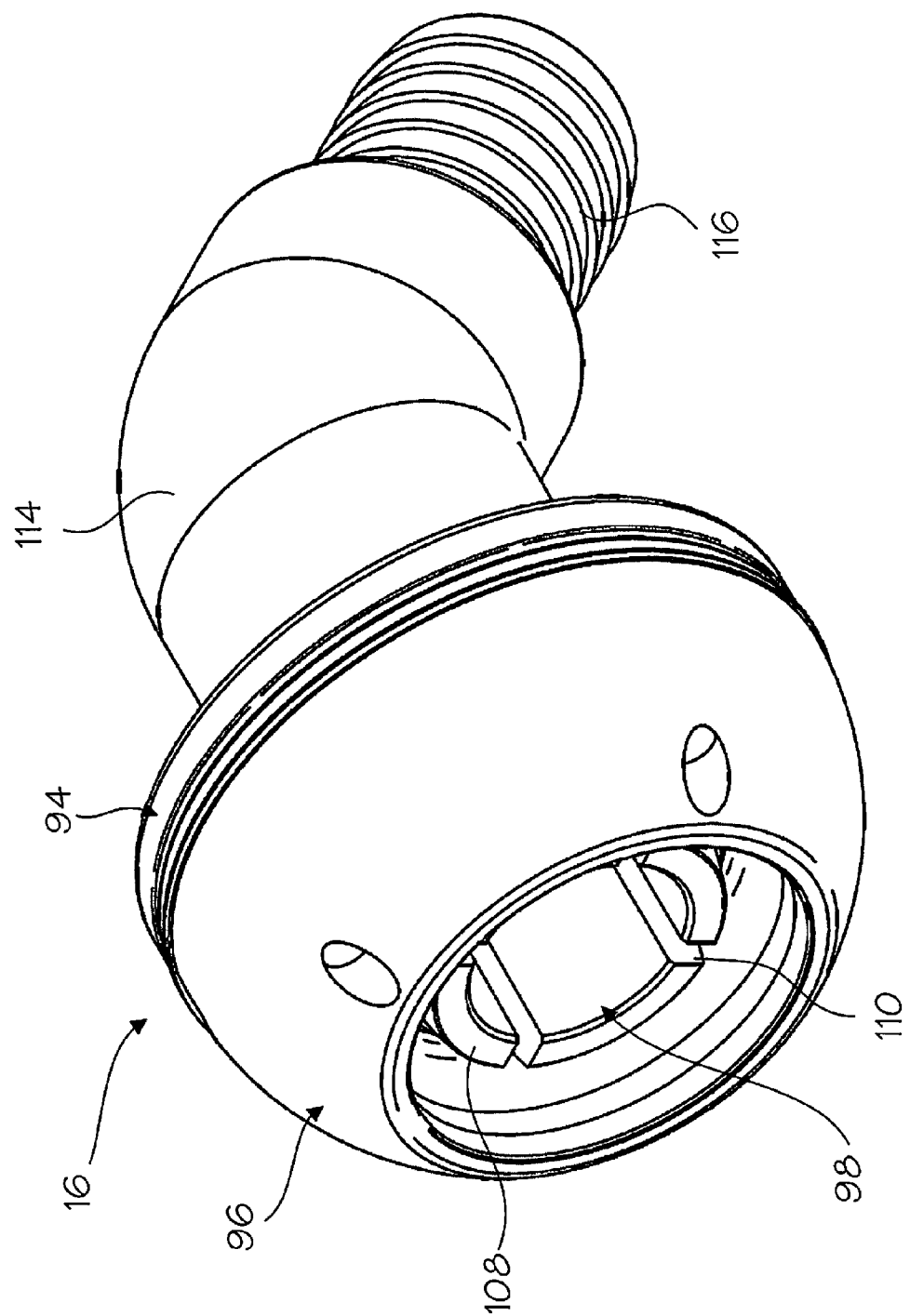
FIG. 6 is a perspective view of the fastener shown in FIG. 5.

FIGS. 5 and 6 show the fastener 16. The fastener 16 comprises a fastener body 94, a fastener cap 96 and a latching element 98.

The fastener body 94 is cylindrical. The fastener body 94 has an externally threaded portion 100 at one end and a radially extending flange 102 at the other. The threaded portion 100 extends through an opening in the baffle 6.

The fastener cap 96 comprises a bore 104 having a threaded portion 106 which corresponds to and engages with the threaded portion 100 of the fastener body 94. The flange 102 and the fastener cap 96 are disposed on opposite sides of the baffle 6 such that the baffle 6 is sandwiched between the flange 102 and the fastener cap 96. The flange 102 is held in pressing engagement with the fastener cap 96 by the threaded portions 100, 106 thereby clamping and sealing the fastener 16 to the baffle 6.

The latching element 98 is cylindrical and extends through the fastener body 94. The latching element 98 comprises longitudinally extending prongs 108 at one end. In the embodiment shown there are four prongs 108 which are spaced apart from each other in the circumferential direction. Each prong 108 comprises a latching feature in the form of a radially outwardly extending hook 110 at its end.

The latching element 98 further comprises a circumferentially extending rib 112 which extends radially outwardly of the latching element 98.

The latching element 98 is arranged with that the fastener body 94 disposed between the hooks 110 and the rib 112 such that linear displacement of the latching element 98 with respect to the fastener body 94 is inhibited.

The latching element 98 comprises a resilient material which allows for each prong 108 to be deformed radially inwardly.

An elbow connector 114 is fitted onto the end of the latching element 98 opposite the prongs 108 and secures the fastener 16 to the tube 18. The elbow connector 114 has a turn through angle of 45 degrees. The elbow connector 114 comprises a serrated fitting 116 onto which an end of the tube 18 is secured. It will be appreciated that an elbow connector 114 having a turn-through angle between 0 degrees and 90 degrees could be used.

The fastener 16 can be attached to the baffle by first clamping baffle 6 between the fastener body 94 and the fastener cap 96. The latching element 98 is then inserted into the fastener body 94 such that the fastener body 94 deforms the prongs 108 radially inwardly as they are inserted into the body 94. Once located in position, the prongs 108 snap back into a nominal shape. The hooks 110 engage with the end of the fastener body 94 to inhibit removal of the latching element 98 from the fastener body 94. The advantage of such a fastener 16 is that the body 94 and the cap 96 can be pre-fitted without the latching element 98. The latching element 98, to which the tube 18 and valve 14 can be pre-fitted, can then be attached making assembly of the connector 8 with the inflatable structure 2 less cumbersome. Once fitted, the latching element 98 is rotatable with respect to the fastener body 94.

Figure 7:
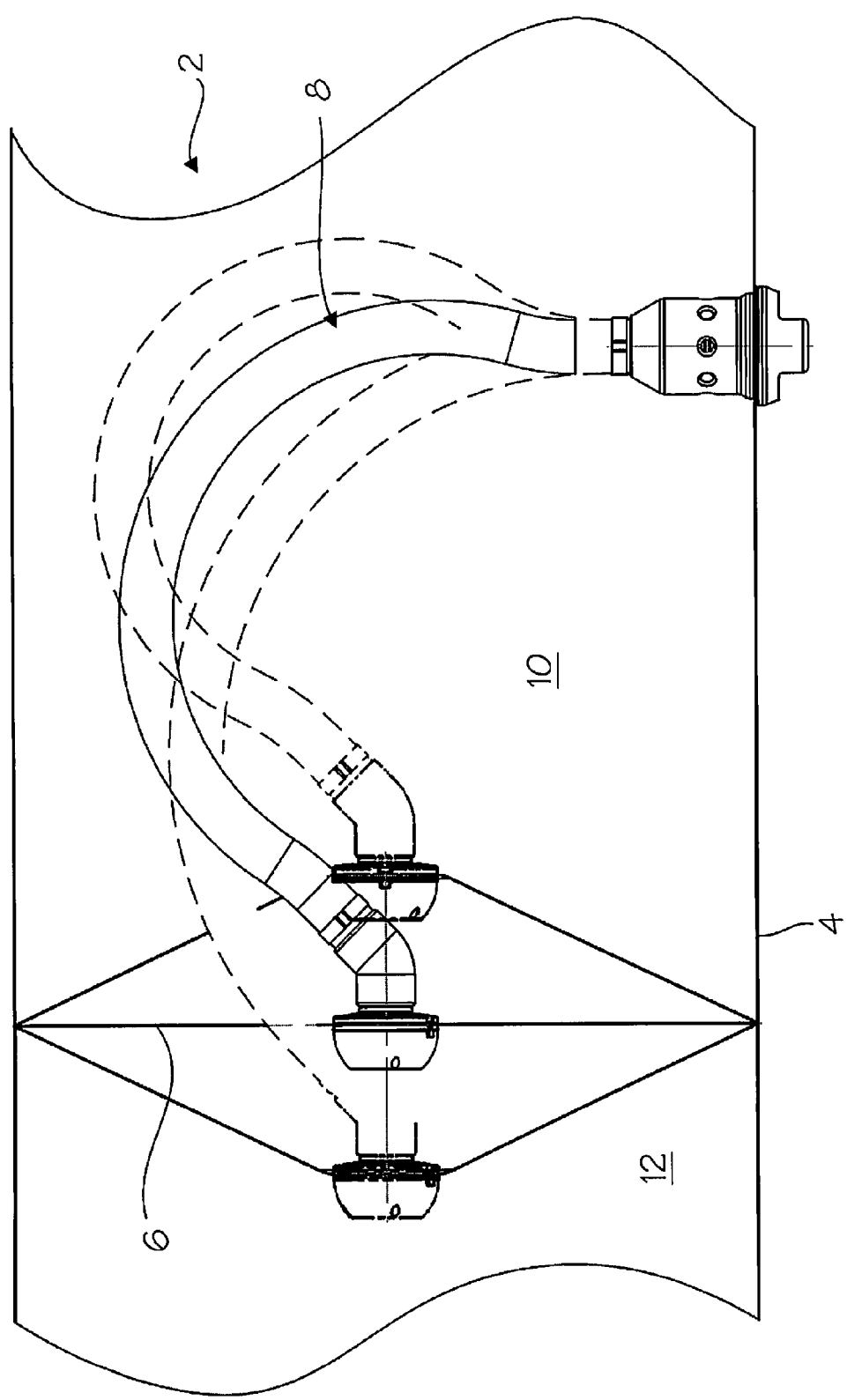
FIG. 7 is a schematic representation of the part of the inflatable structure shown in FIG. 1 during use.

As shown in FIG. 7, the connector 8 accommodates deformation of the baffle 6 during inflation, deflation and during use of the inflatable structure 2 when inflated. It will be appreciated that the fastener 16 can be attached to the baffle 6 at any convenient location.

The valve 14, which may be fitted before connecting the fastener 16, is assembled as part of the inflatable structure 2 by clamping the outer wall 4 of the inflatable structure 2 between the first and second parts 28, 30 of the valve body 22. As described previously, the actuator 26 is fixed linearly with respect to the second part 30 of the valve body 22. Consequently, the position of the actuator 26 will vary in accordance with the thickness of the wall 4 to which the valve 14 is attached. The slidable arrangement of the keyed portion 62 of the valve member 24 with respect to the drive part 80 of the actuator 26 allows for displacement of the valve member 24 with respect to the actuator 26 in order to accommodate different thicknesses of wall 4 without affecting the position or stroke of the valve member 24 with respect to the first part 28 of the valve body 22. Consequently, the valve 14 can be readily attached to structures having different wall thicknesses.

Prior to inflation of the inflatable structure 2, the valve 14 is opened by manually rotating the actuator 26 with respect to the valve body 22 in an anticlockwise direction. Rotation of the actuator 26 causes the valve member 24 to rotate with the actuator 26 with respect to the valve body 22.

The edges of the slots 68 slide over the pin 70 thereby driving the valve member 24 with respect to the valve body 22 towards the actuator 26. The sliding arrangement of the keyed portion 62 of the valve member 24 and the drive part 80 of the actuator 26 accommodates linear movement of the valve member 22 towards the actuator 26. The spring 92 resists movement towards the actuator 26 such that release of the actuator 26 results in the valve member 24 returning to the closed position. The first retainer 90, rib 91 and second retainer 93 prevent the actuator 26 from being displaced linearly with respect to the valve body 22. Components of the actuator 26 do not therefore become exposed when the valve is opened which means there is less likelihood of damage to the valve 14.

The linear motion of the valve member 24, with respect to the valve body 22, moves the seal 78 out of sealing engagement with the first section 46 of the bore 32 and moves the ports 66 into alignment with the inlet passages 36. The inlet passages 36 are therefore in fluid communication with the valve outlet 38 through the valve member 24.

Once the pin 70 reaches the end of one or both of the slots 68, further rotation of the valve member 24 is prevented by the ends of the slots 68 acting against the pin 70. This positive indication that the valve member 24 is in the open position makes it easy for the operator of the valve 14 to determine that the valve 14 is open. Furthermore, restricting rotation of the actuator to less than one revolution in order to move the valve member 24 between the closed position and the open position enables the condition of the valve member 24 to be readily determined. For example, the cap 82 may be provided with visual or tactile features which enable the position of the actuator 26, and hence the condition of the valve member 24, to be determined by visual inspection of the actuator 26 or by touch. The locking features 69 at the ends of the slots 68 retain the valve member 24 in the open position. In particular, the locking feature 69 prevents the valve member 24 from being moved from the open position by the force exerted by the spring 92 on the valve member 24 in the longitudinal direction of the valve member 24. The actuator 26 can therefore be released by the operator during inflation of the inflatable structure 2 without the valve member 24 being automatically returned to the closed position by the action of the spring 92.

The inflatable structure 2 is inflated by supplying gas (for example air, carbon dioxide or a mixture containing nitrogen) to the first chamber 10, for example through an inlet valve (not shown) in the outer wall 4 of the chamber 10. Gas passes from the first chamber 10 through the inlet passages 36, through the ports 66, passage 65, outlet 38 and into the tube 18. The gas passes along the tube 18 through the fastener 16 and into the second chamber 12. The spring 20 disposed within the tube 18 ensures that the tube 18 does not become kinked, flattened or excessively twisted which would inhibit fluid communication, and therefore passage of gas, through the tube 18.

Once the inflatable structure 2 is inflated, the valve 14 is closed by manually rotating the actuator 26 with respect to the valve body in the clockwise direction. The valve member 24 is driven against the pin 70 which drives the valve member 24 away from the actuator 26 into the closed position. The ports 66 are therefore moved out of alignment with the inlet passages 36 and into the first section 46. At the same time, the seal 78 is moved into sealing engagement with the surface of the first section 46 of the bore 32 thereby sealing the inlet passages 36 from the outlet 38. Flow of fluid between the inlet passages 36 and the outlet 38 is therefore prevented. The first and second chambers 10, 12 are therefore isolated from each other by the valve 14.

The valve 14 can be re-opened to deflate the structure 2 though the first chamber 10.

It will be appreciated that the valve 14, fastener 16 and tube 18 could be used together or independently of each other. The valve 14, fastener 16 and/or tube 18 could be used in other types of inflatable structures, such as inflatable tents.

It will be appreciated that gas could be supplied to the second chamber 12 and from the second chamber 12 to the first chamber 10 in order to inflate the inflatable structure 2.

While the invention has been described with reference to preferred and example embodiments, it will be understood by those skilled in the art that a variety of modifications, additions and deletions are within the scope of the invention, as defined by the following claims.

What is claimed is:

1. A valve comprising:
   a valve body having a first part and a second part which are arranged to clamp a portion of a wall of an inflatable structure between the first part and the second part thereby securing the valve to the inflatable structure, the first part comprising an inlet and an outlet;
   a valve member moveable in a linear direction with respect to the valve body between a closed condition in which flow between the inlet and the outlet is restricted and an open condition; and
   an actuator coupled to the valve member such that the valve member is constrained to rotate with the actuator and is movable in the linear direction with respect to the actuator,
   wherein the valve is configured such that rotation of the actuator causes the valve member to move in the linear direction with respect to both the actuator and the valve body between the closed condition and the open condition, and
   wherein the second part of the valve body supports the actuator for rotation with respect to the valve body, the valve member being arranged with respect to the actuator and the second part of the valve body such that the position of the valve member in the linear direction with respect to the first part of the valve body is maintained when different thicknesses of wall of an inflatable structure are clamped between the first part and the second part of the valve body.

2. A valve as claimed in claim 1, wherein the valve comprises a first stop which prevents continued rotation of the actuator with respect to the valve body when the valve member is moved into the open condition, and a second stop which prevents continued rotation of actuator with respect to the valve body when the valve member is moved into the closed condition.

3. A valve as claimed in claim 2, wherein the first and second stops are arranged such that the valve member is displaced between the open condition and the closed condition by rotating the actuator through less than one revolution with respect to the valve body.

4. A valve as claimed in claim 3, wherein the valve member is arranged with respect to the valve body such that rotation of the valve member with respect to the valve body causes the valve member to move in the linear direction.

5. A valve as claimed in claim 4, wherein the actuator is arranged with respect to the valve body such that the actuator is constrained with respect to the valve body in the linear direction.

6. A valve as claimed in claim 1, wherein the valve comprises a bias which is arranged to bias the valve member into the closed condition.

7. A valve as claimed in claim 6, wherein the bias comprises a resilient member disposed between the valve member and the actuator.

8. A valve as claimed in claim 1, wherein a passage is provided through the valve member, the passage being arranged such that when the valve member is in the open condition, the inlet and the outlet are in fluid communication with each other through the passage.

9. A valve as claimed in claim 8, wherein the passage has an inlet port which is aligned with the inlet when the valve member is in the open condition and is obstructed by the valve body when the valve member is in the closed condition.

10. A valve as claimed in claim 1, wherein the actuator comprises a cap which is manually rotatable.

11. A valve as claimed in claim 1, further comprising a locking feature which is arranged to releasably lock the valve member in the open condition.

12. An inflatable structure comprising: first and second chambers, and a valve in accordance with claim 1, the valve being arranged such that the inlet is disposed within the first chamber, wherein the first chamber and second chamber are in fluid communication with each other through the valve.

13. An inflatable structure as claimed in claim 12, wherein at least a portion of the valve extends through a wall of the first chamber such that the actuator is actuable from outside of the inflatable structure.

14. An inflatable structure as claimed in claim 12, wherein the valve outlet is connected to the second chamber by a collapsible tube, wherein a resilient spacer extends along at least part of the tube to resist collapsing of the tube.

15. A method of inflating an inflatable structure as claimed in claim 12, wherein the method comprises:
    opening the valve;
    supplying gas to the first chamber or second chamber to inflate both the first and second chambers; and
    closing the valve to isolate the first chamber from the second chamber.

16. A method of deflating an inflatable structure as claimed in claim 12, wherein the method comprises:
    opening the valve; and
    expelling gas from the first chamber or second chamber into the other of the first and second chambers.

17. A connector comprising a valve as claimed in claim 1, wherein the connector further comprises a fastener and a tube extending between the valve and the fastener, wherein the fastener comprises a fastener body which is arranged to be fixed to a wall of an inflatable structure and a latching element which is connected to the tube, wherein the fastener body and the latching element comprise corresponding fastening features which are configured to provide a snap-fit connection between the fastener body and the latching element.

18. A connector as claimed in claim 17, wherein the latching element is configured such that it is rotatable with respect to the fastener body when the latching element is latched to the fastener body.

* * * * *